(12) United States Patent
Lee et al.

(10) Patent No.: US 6,934,785 B2
(45) Date of Patent: Aug. 23, 2005

(54) HIGH SPEED INTERFACE WITH LOOPED BUS

(75) Inventors: Terry R. Lee, Boise, ID (US); Roy Greeff, Boise, ID (US); David Ovard, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 570 days.

(21) Appl. No.: 09/741,821

(22) Filed: Dec. 22, 2000

(65) Prior Publication Data

US 2004/0225770 A1 Nov. 11, 2004

(51) Int. Cl.$^7$ .............................................. G06F 13/00
(52) U.S. Cl. ...................... 710/300; 710/104; 711/154
(58) Field of Search ................. 710/300, 305, 710/306, 104; 711/147, 138, 154, 111; 370/474, 351

(56) References Cited

U.S. PATENT DOCUMENTS

| | | | |
|---|---|---|---|
| 4,974,152 A | | 11/1990 | Guiffant et al. |
| 5,081,648 A | | 1/1992 | Herzog |
| 5,452,330 A | * | 9/1995 | Goldstein ................. 375/257 |
| 5,623,644 A | | 4/1997 | Self et al. |
| 5,631,906 A | * | 5/1997 | Liu ............................ 370/455 |
| 6,014,037 A | * | 1/2000 | Gabara et al. ............. 326/30 |
| 6,233,253 B1 | * | 5/2001 | Settle et al. ............... 370/474 |
| 6,286,067 B1 | * | 9/2001 | James et al. ............... 710/104 |
| 6,356,984 B1 | * | 3/2002 | Day et al. ................... 711/147 |

FOREIGN PATENT DOCUMENTS

| WO | WO 99/19874 | 4/1999 |
|---|---|---|
| WO | WO 99/30240 | 6/1999 |

OTHER PUBLICATIONS

Yasuhiro Konishi et al., "Interface Technologies for Memories and ASICs—Review and Future Direction—", IEICE Transactions on Electronics, vol. E82–C. No. 3 Mar. 1999.

Alfredo Moncayo et al., "Physical Layer Design of a 1.6 GB/s DRAM Bus", 1999 IEEE.

Gustavson, D., "SCIzzL: The Local Area Memory Port," http://www.scizzl.com, 9 pages, reviewed Oct. 2, 2000.

Gustavson, D. "SCI Industrial Takeup and Future Developments," http://www.scizzl.com/Perspectives.html, 13 pages, reviewed Oct. 2, 2000.

"Hot Rod™ High–Speed Serial Link Gallium Arsenide," Gazelle Microcircuits, Inc. pp. 1–35.

* cited by examiner

*Primary Examiner*—Khanh Dang
(74) *Attorney, Agent, or Firm*—Dickstein Shapiro Morin & Oshinsky LLP

(57) ABSTRACT

A method and associated apparatus is provided for improving the performance of a high speed memory bus by substantially eliminating bus reflections caused by electrical stubs. The stubs are substantially eliminated by connecting system components in a substantially stubless configuration using a looping bus for continuing the looping bus through each device. The invention also provides an interface circuit that enables data communications between devices of different technologies. The interface circuit connects to the looping data bus and includes a circuit for providing voltage level, encoding type, and data rate conversions for data received from the looping data bus and intended for use on a second data bus connected to the interface circuit.

57 Claims, 10 Drawing Sheets

HIGH SPEED INTERFACE WITH LOOPED BUS

FIELD OF THE INVENTION

The present invention relates to improving the performance of a bus for data communications and, more particularly, to a high speed data bus.

BACKGROUND OF THE INVENTION

Memory device manufacturers are under continuous pressure to increase the performance and reduce the cost of the memory devices they produce. Memory systems for computers typically provide many memory devices on a common multidrop bus to allow larger storage and transmission capacities than can be obtained with a single memory device. To improve the maximum throughput of the bus, data communicated to and from the memory devices may be multiplexed for transmission on the bus, thereby reducing the pin count of a memory bus master or controller. For example, a 64-bit wide data word may be transmitted over a 16 bit data bus as four successive 16-bit data word portions.

In addition, such systems typically include user upgradable or replaceable components to allow future expansion or repair of the memory subsystems. Typically, these systems are upgraded on a module basis, where the memory module (e.g., a dual in-line memory module or DIMM) includes several memory devices on a small printed circuit board (PCB), and the module plugs into a connector that provides an electrical connection to the memory subsystem bus.

Connection of multiple memory devices to the bus can degrade the performance of the bus since the modules are typically connected in a configuration having electrical stubs which cause signal reflections on the bus. These reflections degrade signal integrity, thus limiting the maximum speed and bandwidth of the system. A robust electrical design is required in a high speed multidrop memory bus since the signal integrity must be acceptable throughout the system for lightly loaded systems, that is, where only a small number of module slots are populated, as well as heavily loaded systems where every module slot, or nearly every module slot, is populated.

Accordingly, there is a strong desire and need to improve the performance characteristics of memory bus systems and other data bus systems in order to permit high speed operation with minimal degradation of signal integrity due to bus reflections.

SUMMARY OF THE INVENTION

The present invention provides a method and associated apparatus for improving the performance of a high speed data bus, e.g., a memory bus. The invention substantially eliminates bus reflections caused by electrical stubs by connecting system components in a stubless or substantially stubless configuration using a looping bus.

In one aspect, the invention provides a high speed bus having reduced signal reflections. The bus is looped through data input/output devices, e.g., memory modules, which connect to the bus.

In another aspect, the invention provides a high speed bus between data exchanging devices which maintains a substantially stubless environment. A first set of I/O pins and a second set of I/O pins are provided at data input/output devices, e.g., memory modules, for continuing a looping data bus through each data input/output device connected to the bus. An integrated interface circuit is connected to the first set and second set of I/O pins at each device for providing voltage level, encoding type, and data rate conversion for data received from or placed on the bus by the data input/output devices.

BRIEF DESCRIPTION OF THE DRAWINGS

The foregoing and other features and advantages of the invention will become more apparent from the detailed description of the exemplary embodiments of the invention given below with reference to the accompanying drawings in which.

DETAILED DESCRIPTION OF THE PREFERRED EMBODIMENTS

The invention provides a bus system which can be used to interconnect data input/output devices. While the invention is described below with reference to a bus system for a memory system, including memory modules as representative data input/output devices, it should be understood that the bus system of the invention may be used with any type of data input/output device. Likewise, it should be understood that the memory controller described in the context of a memory system may be a bus controller for use with other data input/output devices.

Figure 1:
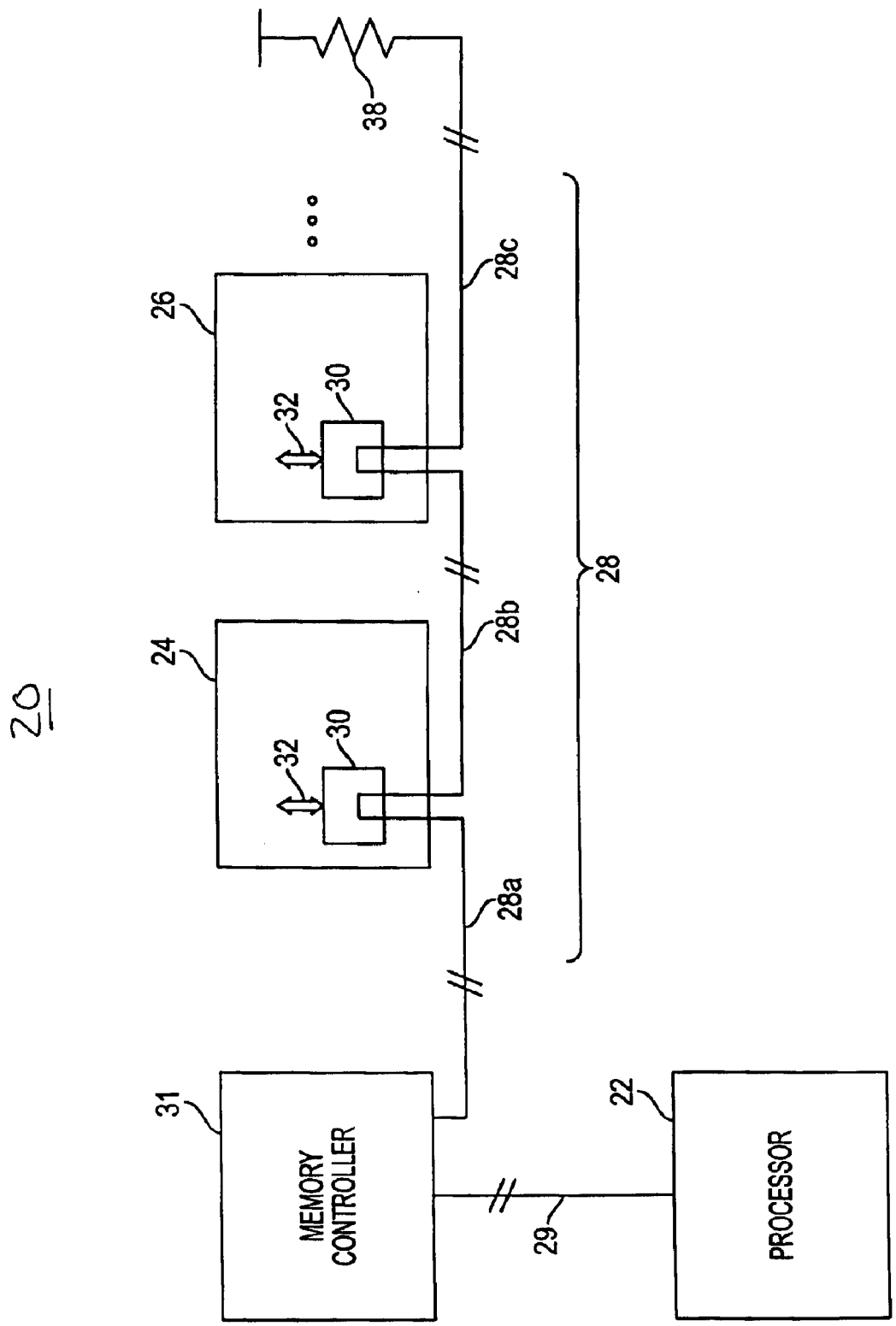
FIG. 1 illustrates a bus topology formed in accordance with a first exemplary embodiment of the invention.

Referring to FIG. 1, an exemplary processor system 20 including a memory subsystem is illustrated employing a high speed bus system of the invention. The processor system 20 includes several data input/output devices, which take the form of memory modules 24, 26, connected to a memory controller 31 with a looping data bus 28, and a processor 22 connected to the memory controller 31 via a conventional bus 29. Each of the memory modules 24, 26, as well as the memory controller 31, has an associated integrated interface circuit 30 connecting each to the looping data bus 28. Each integrated interface circuit 30 permits data exchange between the looping data bus 28 and another data pathway, for example, a second data bus 32, shown at each of the respective memory modules 24, 26. The second data bus 32 is connected to individual memory devices, e.g., DRAM chips, provided on the modules 24, 26. The looping data bus 28 may terminate in a bus terminator, for example a bus terminating resistor 38.

Although two memory modules 24, 26 are illustrated, it should be understood that any number of memory modules may be connected to bus 28 in accordance with the invention.

The looping data bus 28 may be a conventional m-bit parallel bus having command and address paths, data paths, and clock (timing) paths. The looping data bus 28 may have a bus width of any number of parallel data paths, but typically has fewer data paths than a second data bus 32 attached to the interface circuit 30. As one example, the looping data bus 28 may be 16 bits wide (16 data paths) while the second data bus 32 may be 64 bits wide (64 data paths). Accordingly, and as described below, data from the memory devices connected to the wide bus 32 can be multiplexed by interface circuit 30 onto the narrower bus 28, while data on bus 28 can be demultiplexed and placed on bus 32. Accordingly, bus 28 operates at a higher data transfer speed than bus 32, enabling memory modules 24, 26 to use lower speed memory devices than would otherwise be required with a high speed bus.

Since the looping data bus 28 has a smaller number of data paths than data bus 32, the integrated interface circuits 30 connect to the looping data bus 28 with a low pin count connection.

The looping data bus 28 is continuous through the memory modules 24, 26. In this way, memory modules on the looping data bus 28 are connected in a "daisy chain." This configuration substantially eliminates bus reflections caused by electrical stubs by connecting system components in a substantially stubless configuration which improves the maximum data rate which can be achieved on bus 28.

Figure 2:
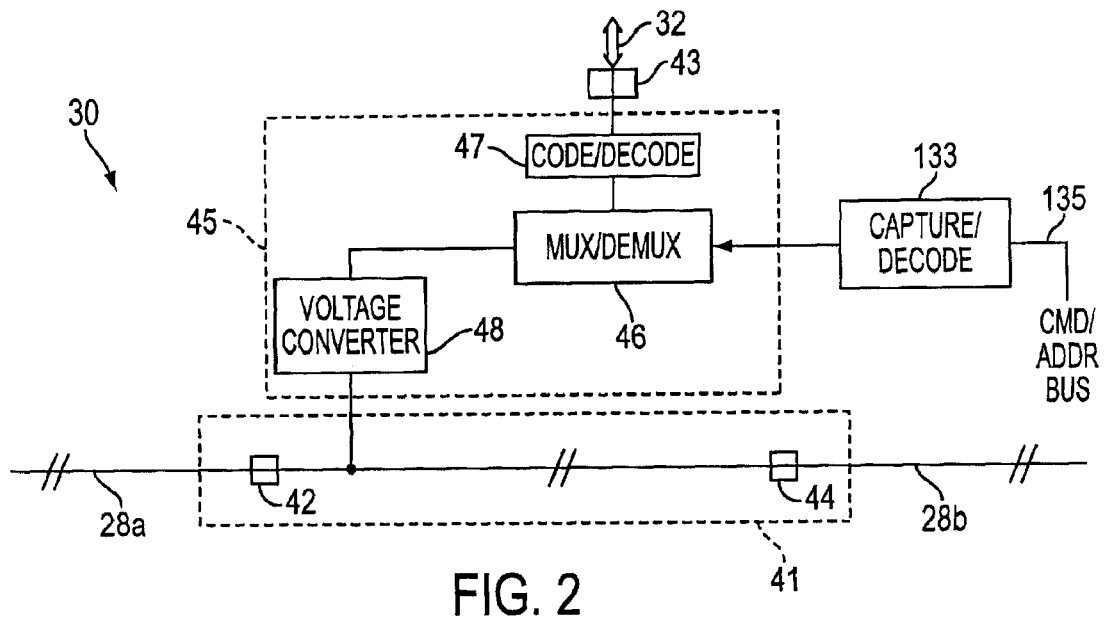
FIG. 2 illustrates in greater detail a portion of FIG. 1.
Figure 9:
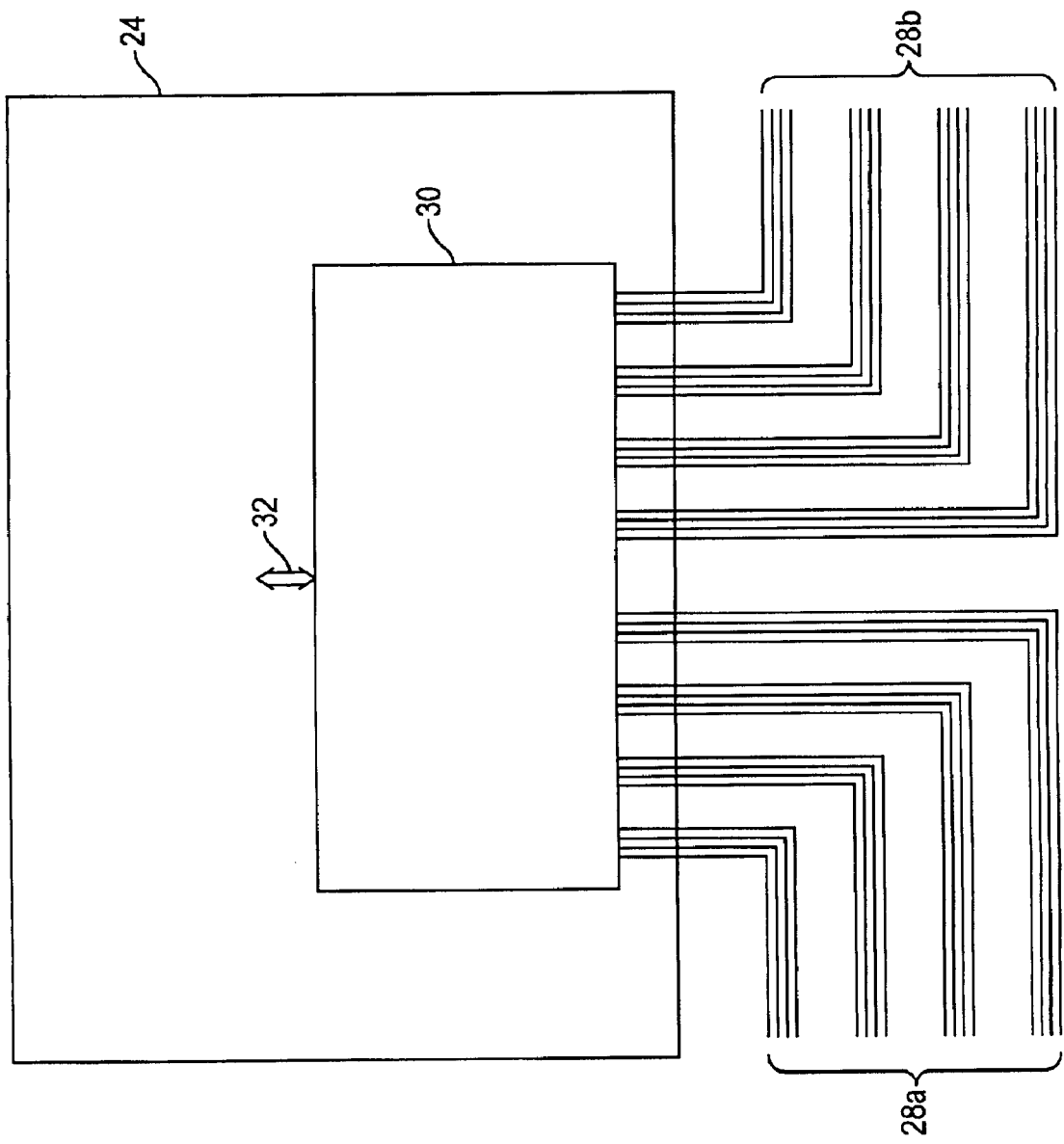
FIG. 9 illustrates a portion of the topology of FIG. 1 in accordance with another exemplary embodiment of the invention.

Referring to FIG. 2, each integrated interface circuit 30 may be connected to the looping data bus 28 by first 42 and second 44 sets of I/O pins (pads). A first set of I/O pins 42 may be connected to a first bus segment 28a and a second set of I/O pins 44 may be connected to a second bus segment 28b. The first and second sets of I/O pins 42, 44 are connected internally within the integrated interface circuit 30 and are also connected to a conversion circuit 45 which converts data appearing on the looping data bus 28 for use on a second bus 32. For the example earlier described of a 16 bit data path on bus 28 and a 64 bit data path on bus 32, each set of I/O pins 42 and 44 will contain 16 pins for the data path, as shown in FIG. 9.

Each of the connections between the integrated interface circuit 30 and the buses, such as the looping data bus 28 and the second data bus 32, may comprise a respective port 43, 41. The first port 41 includes the first and second sets of I/O pins 42, 44. Data on the looping data bus 28 passes through the first port 41 and is also optionally received by the interface circuit 30 at the first port 41. Any data received at an interface circuit 30 may then be converted in conversion circuit 45 for use on the second bus 32.

Data may be selectively received by the interface circuit 30 at the first port 41 according to a selection signal received at the integrated interface circuit 30. The selection signal may be available to the interface circuit 30 on a conventional unlooped memory system command and address bus 135, as shown in FIG. 2. For example, signals received from a conventional command and address bus 135 are captured and decoded by circuitry 133 and may contain instructions for controlling reception of data at integrated interface circuit 30, for example, a WRITE command directing the integrated interface circuit 30 to receive data available on the looping data bus 28 for storage at a memory device connected to the second data bus 32. The command and address bus 135 may also provide each memory module 24, 26 with address signals for read and write operations.

Figure 11:
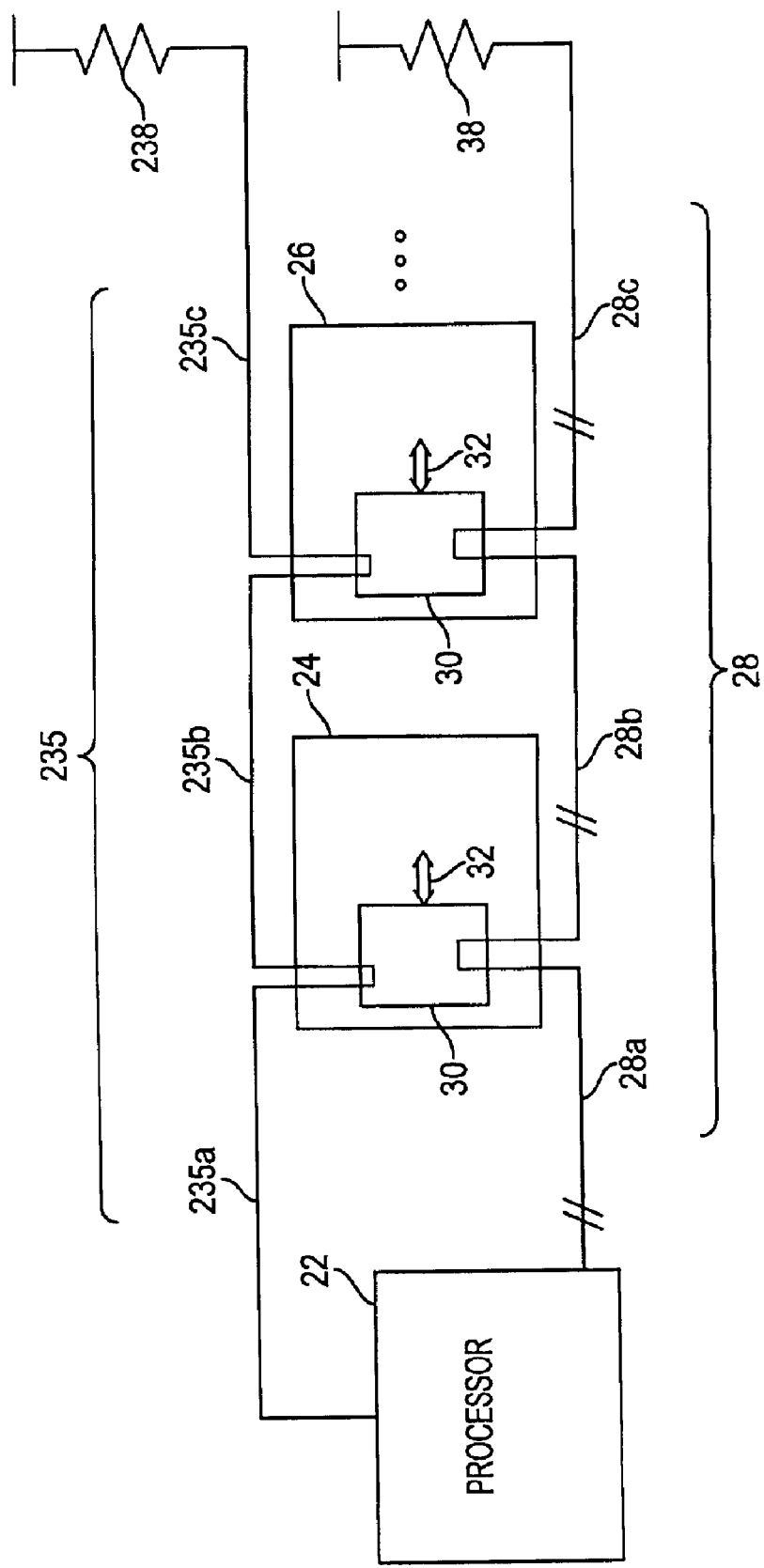
FIG. 11 illustrates a bus topology formed in accordance with another exemplary embodiment of the invention.

Alternatively, as illustrated in FIG. 11, selection signals may be made available to the interface circuit 30 on a looping command and address bus 235 having a construction similar to the looping data bus 28 for passing selection signals and other information used by the interface circuit 30. Referring to FIG. 11, the looping command and address bus 235 may include segments 235a, 235b, 235c, connecting the integrated interface circuits 30 of the system components, and may be terminated by a bus terminator 238.

An alternative to the use of selection signals such as those provided on the command and address bus 135 is to embed selection signals in signals transmitted on the looping data bus 28 shown in FIG. 1 during times when no data is being transmitted.

Referring again to FIG. 2, the second data bus 32 may have operating requirements that differ from those of looping data bus 28, for example the second data bus 32 may be a higher pin count, higher voltage, lower data rate bus that uses a data encoding different from that of the looping data bus 28. Therefore, the conversion circuit 45 may convert the data received from the looping data bus 28 for use on the second data bus 32. The conversion circuit may include a multiplexer/demultiplexer 46 for converting the data rate and number of data paths (e.g., between 16 and 64 data paths), a coder/decoder 47 for appropriately coding/decoding the data between buses 28 and 32, and a voltage converter 48, which permit data available on the looping data bus 28 to be appropriately configured for the second bus 32 and vice versa.

Figure 3:
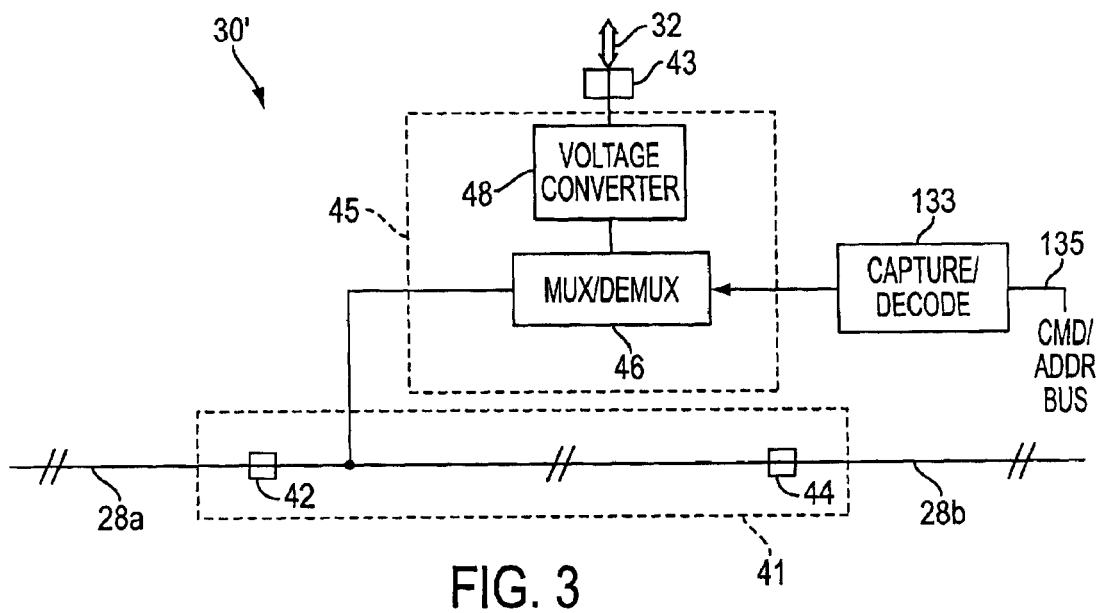
FIG. 3 illustrates a modified first embodiment of the portion shown in FIG. 2.

As shown in FIG. 2, voltage conversion may be performed using a voltage converter 48 provided between the looping data bus 28 and the multiplexer/demultiplexer 46. This is not required, however, and as illustrated in the integrated interface circuit 30' shown in FIG. 3, voltage conversion may instead be performed at a voltage converter 48 located between the second data bus 32 and the multiplexer/demultiplexer 46.

The conversion circuit 45 may convert data on the looping data bus 28 for use on the second data bus 32, but the corresponding conversion in the opposite direction (i.e., from the second data bus 32 to the looping data bus 28) is also performed by the conversion circuit 45 in accordance with the invention.

The integrated interface circuit 30 may be turned off when the second data bus 32 is not active, for example in response to selection signals received on the command and address bus 135. The looping function of the first and second sets of I/O pins 42, 44 is passive and the connection between the first and second segments 28a, 28b is maintained when an integrated interface circuit 30 is deactivated.

The integrated interface circuit 30 allows devices of different technologies to communicate and exchange data. For example, data may be exchanged between a processor and memory modules 24, 26 (either directly or through the memory controller 31) at high speed using the looping data bus 28, while the second data bus 32 may connect to memory devices that operate at a lower speed. In this example, the slower data rate of the bus 32 connected to the memory devices allows for the use of inexpensive memory integrated circuits (ICs).

Moreover, use of a looping data bus 28 may permit the construction of a non-parallel terminated network of devices. Referring to FIG. 1, each of the devices on the bus, including the memory controller 31 and other system devices 24, 26, is connected to respective segments 28a, 28b, 28c of the looping data bus 28 to form a "daisy chain." The looping data bus 28 is terminated at a bus terminator 38; however, in some lower data rate systems, it may be possible to remove the bus terminator since the bus is substantially stubless. Such a bus system may permit implementation of a memory subsystem with smaller drivers of lower capacitance, lower voltage level due to the lack of a termination resistor in the individual segments 28a, 28b (i.e., no DC load current), and having decreased power consumption.

Figure 8:
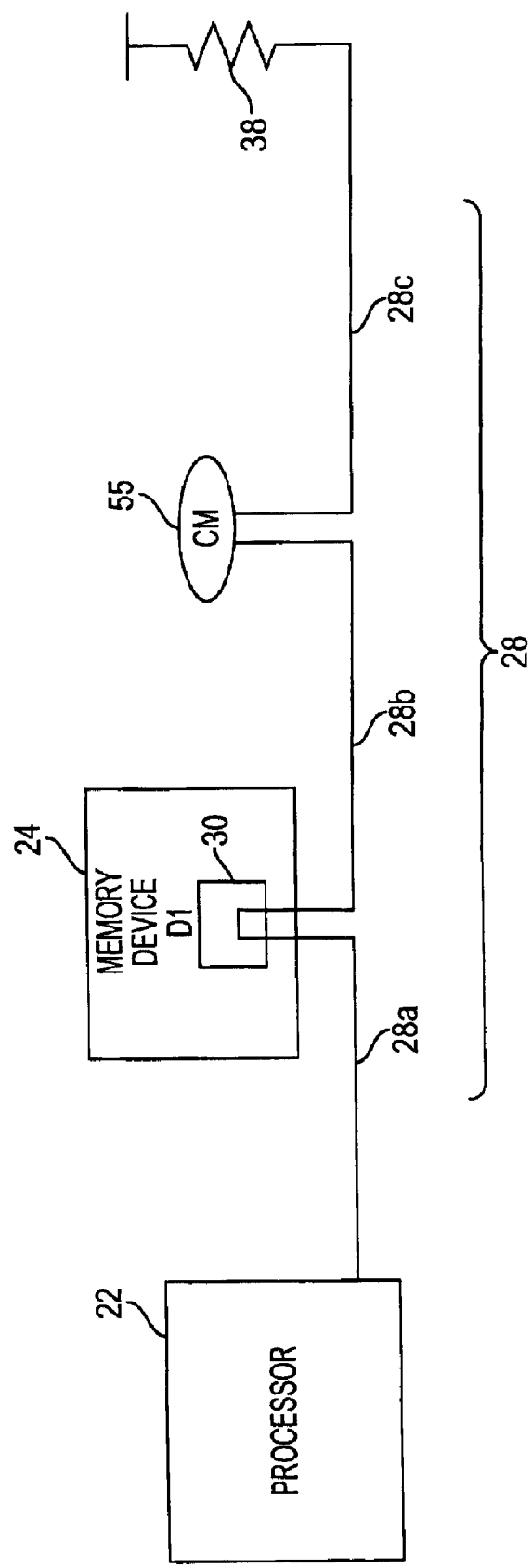
FIG. 8 illustrates a bus topology formed in accordance with another exemplary embodiment of the invention.

When a device is removed from looping data bus 28, e.g., a memory module is absent, a low cost jumper 55 or other simple continuity module (CM) may be used to maintain the continuity of the bus 28, as shown in FIG. 8.

Figure 4:
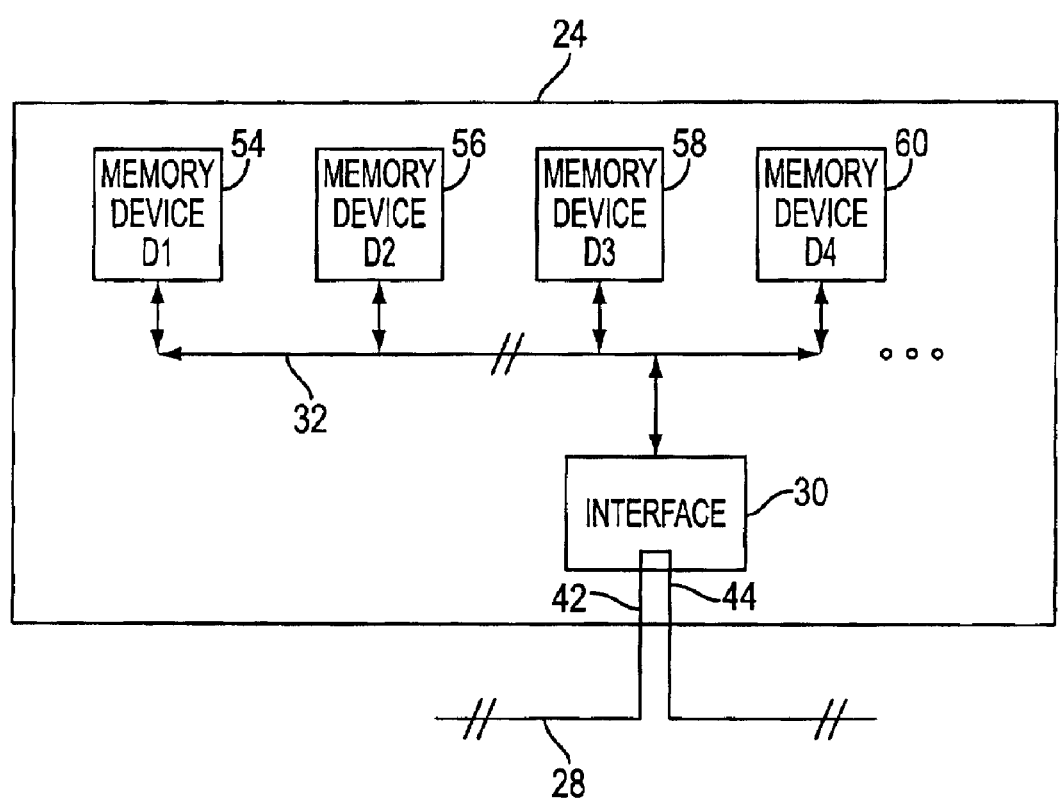
FIG. 4 illustrates a memory module formed in accordance with a first exemplary embodiment of the invention.

As noted, one potential use of looping bus 28 is for a memory system including memory modules 24, 26. FIG. 4 illustrates one of the memory modules 24, which includes a plurality of memory devices 54, 56, 58, 60, mounted on a printed circuit board with the integrated interface circuit 30. Each of the memory devices 54, 56, 58, 60 is connected to a memory bus 32 that also connects to the integrated interface circuit 30. In addition, the integrated interface circuit 30 connects to the looping data bus 28 using the first and second sets of I/O pins 42, 44.

In operation, the integrated interface circuit 30 receives data from another device connected to the looping data bus 28, e.g., from a memory controller 31, converts the data for use on the memory bus 32, and transmits the data on the memory bus 32 to the individual memory devices 54, 56, 58, 60. The integrated interface circuit 30 also receives data available on the memory bus 32 and converts the data for use on the looping data bus 28. Any necessary data rate, voltage, or other conversions which may be required for data to be exchanged between the looping data bus 28 and the memory bus 32, for example between the memory controller 31 and the memory devices 54, 56, 58, 60, are performed at interface 30. For example, referring to FIGS. 1 and 4, the integrated interface circuit 30 may be connected to the memory controller 31 via the looping data bus 28, which operates at a 1 Gbit/sec data rate, 1 volt voltage level, and a narrow bus width (low pin count) of 16 data paths (bits). In contrast, the memory bus 32, connected to the integrated interface circuit 30, may operate at a 250 Mbit/sec data rate, 1.8 volt voltage level, and a wide bus width (high pin count) of 64 data paths (bits). For a memory WRITE operation initiated by the processor 22 or the memory controller 31 to store data using the memory devices 54, 56, 58, 60, the WRITE data is transmitted on the looping data bus 28 from the memory controller 31 to the integrated interface circuit 30, the WRITE data is converted, and transmitted on the memory bus 32 to one or more of the memory devices 54, 56, 58, 60. READ data from the memory devices 54, 56, 58, 60 flows in the opposite direction to the memory controller 31.

Figure 7:
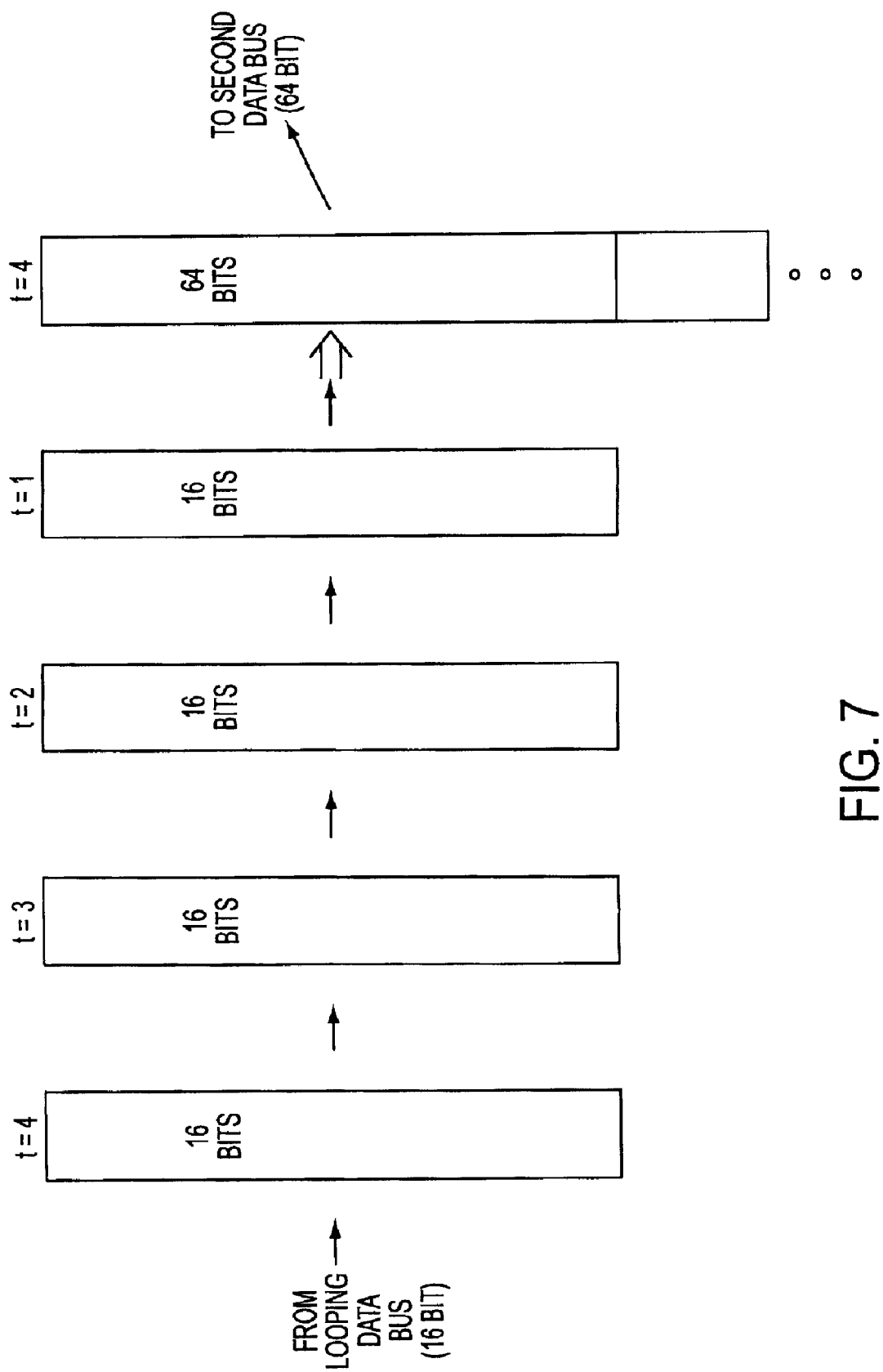
FIG. 7 illustrates a timing example in accordance with an exemplary embodiment of the invention.

FIG. 7 illustrates a timing example for data exchange between a 16-bit looping data bus 28 and a 64-bit memory bus 32. The integrated interface circuit 30 may receive 16 bits of data at time t=1, t=2, t=3, and t=4. At time t=4, after the integrated interface circuit 30 has received a total of 64 bits of data, from the looping data bus 28, the received data may be passed to the memory bus 32 via the 64 data paths of the memory bus 32. This data rate conversion and/or buffering may be performed using the multiplexer/demultiplexer 46 (FIG. 2). Any other voltage conversions or data encoding/decoding functions needed are performed at the interface circuit 30 as described above and illustrated in FIGS. 2 and 3.

For a memory READ operation, the converse data transfer operation from the memory devices 54, 56, 58, 60, to the memory controller 31 is performed. That is, 64 bits of data on bus 32 are multiplexed by interface circuit 30 as four 16 bit data segments which are sequentially placed on looping data bus 28.

Figure 5:
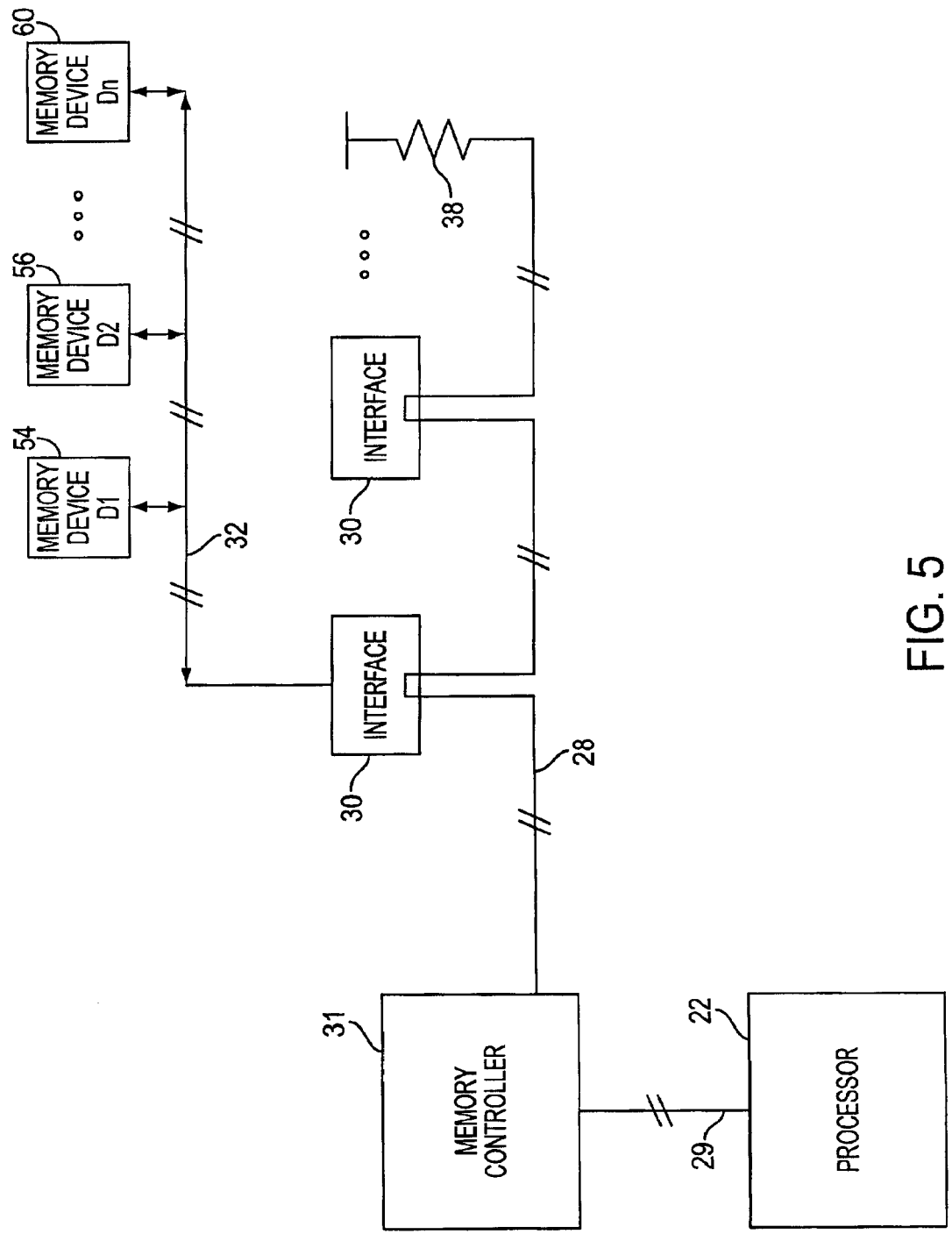
FIG. 5 illustrates a bus topology formed in accordance with another exemplary embodiment of the invention.

FIGS. 4–5 also illustrate that the memory devices 54, 56, 58, 60, attached to the memory bus 32 may be mounted on a single memory module 24 (FIG. 4) or, alternatively, may be mounted on respective printed circuit boards (PCBs) or other support structure (FIG. 5), but nevertheless each memory device 54, 56, 58, 60 is connected to the memory bus 32.

Figure 6:
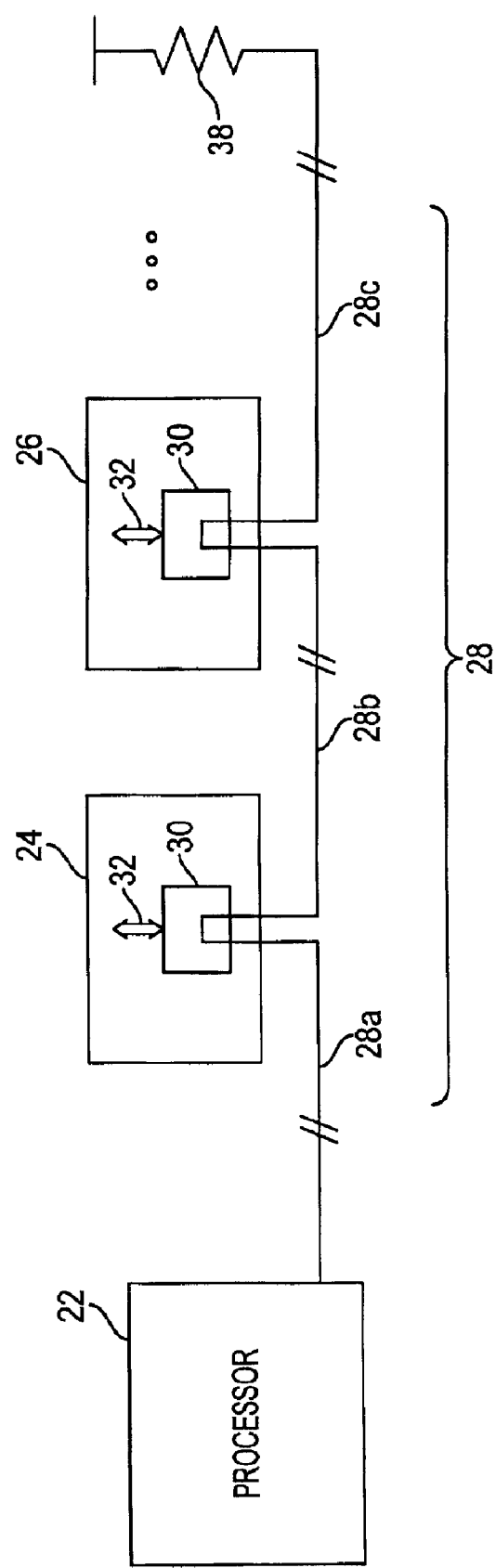
FIG. 6 illustrates a bus topology formed in accordance with another exemplary embodiment of the invention.

The memory controller 31 is connected to the looping data bus bus 28 and may exchange data with each of the integrated interface circuits 30. Alternatively, as shown in FIG. 6, the memory controller 31 may be omitted and the processor 22 may be connected to the looping data bus 28. In this arrangement, the processor 22 may exchange data over the looping data bus 28 with each of the integrated interface circuits 30, which in turn communicate with memory devices on the memory modules 24, 26 over the second data buses 32.

The embodiment illustrated in FIG. 6 advantageously eliminates the need for a separate memory controller chip conventionally used as an intermediary between the processor and the memory devices in a typical computer system. For an exemplary system in which the integrated interface circuit 30 adds latency to data communications between devices connected to the looping data bus 28 and the second data bus 32 (FIG. 1), any loss in performance may be alleviated by elimination of a conventional memory controller. Some functions formerly provided by a conventional memory controller, such as memory address-to-module mapping, may be performed instead at the processor 22. Other functions formerly performed by a conventional memory controller, such as voltage conversion, may be performed by the integrated interface circuit 30. Thus, the latency associated with the memory controller may be eliminated while still permitting processors and memory devices of differing voltage levels to interoperate.

Latency could also be improved by including an additional multiplexer in the integrated interface circuit 30 for performing multiplexing tasks ordinarily performed at individual memory devices on the second data bus 32. This would allow the multiplexing tasks to be performed at the higher operating rate of the integrated interface circuit 30.

Figure 10:
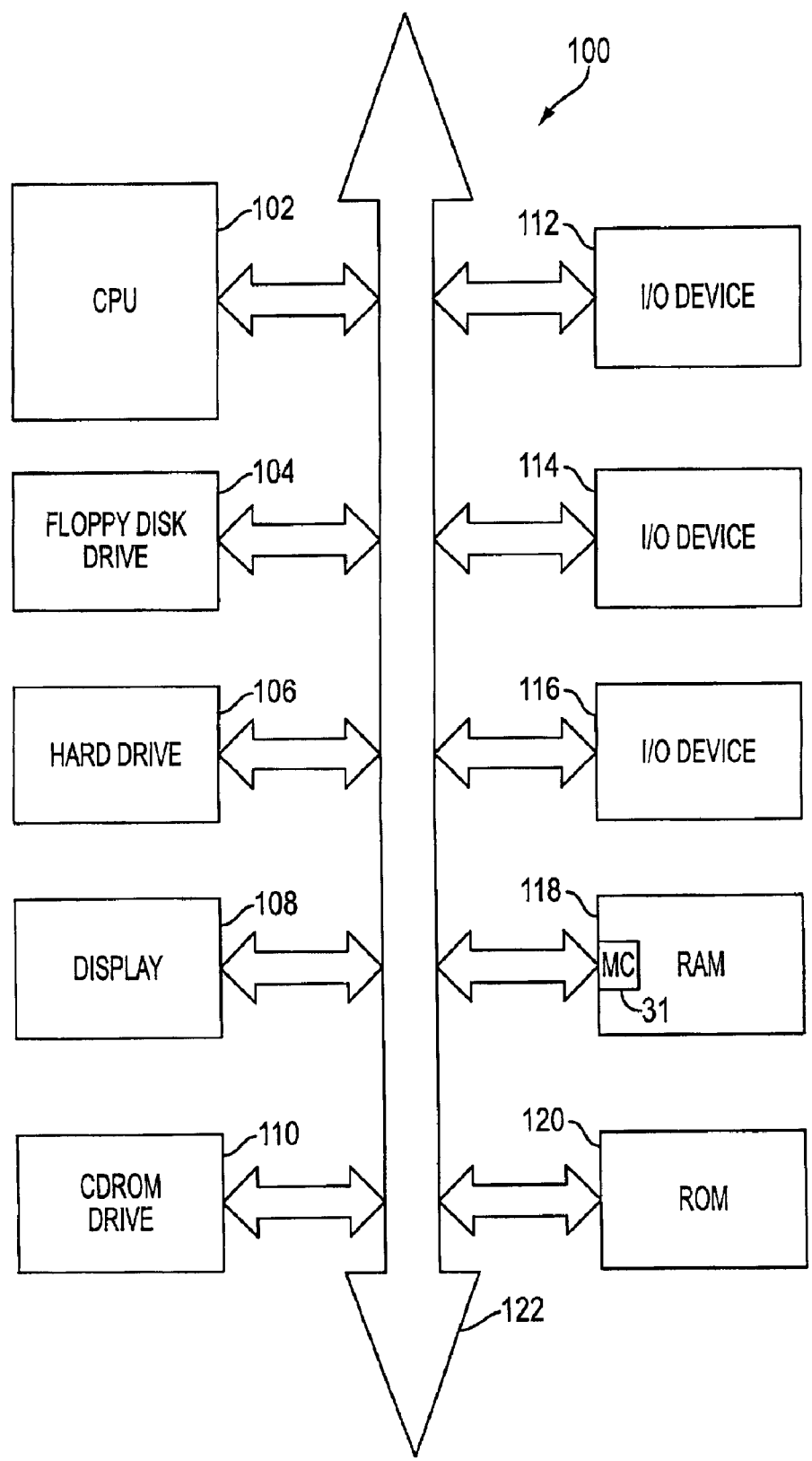
FIG. 10 illustrates a processor system formed in accordance with another exemplary embodiment of the invention.

FIG. 10 illustrates another exemplary processor system which may include a looping data bus 28. Referring to FIG. 10, the processor system, which may be a computer system 100, for example, generally comprises a central processing unit (CPU) 102, for example, a microprocessor, that communicates with one or more input/output (I/O) devices 112, 114, 116 over a system bus 122. The computer system 100 also includes random access memory (RAM) 118, a read only memory (ROM) 120 and, in the case of a computer system may include peripheral devices such as a floppy disk drive 104, a hard drive 106, a display 108 and a compact disk (CD) ROM drive 110 which also communicate with the processor 102 over the bus 122. The RAM 118 includes memory devices communicating with a memory controller 31 via a looping data bus 28 constructed in accordance with the invention. This configuration of the computer system 100 permits high speed communication and/or data transfer between different types of data devices, for example between the processor 102 and the memory controller 31 at the RAM 118. It should be noted that FIG. 10 is merely representative of another of many different types of processor system architectures which may employ the invention.

Although the looping data bus 28 has been described with reference to a digital data system, e.g., a memory system having memory modules 24, 26, the looping data bus 28 can be used to transmit signals of any types, including analog, digital and radio frequency (RF) signals.

While the invention has been described and illustrated with reference to specific exemplary embodiments, it should be understood that many modifications and substitutions can be made without departing from the spirit and scope of the invention. Accordingly, the invention is not to be considered as limited by the foregoing description but is only limited by the scope of the appended claims.

What is claimed as new and desired to be protected by Letters Patent of the United States is:

1. A data transfer interface, comprising:
    a first data bus, said first data bus including a first bus segment and a second bus segment, each of said first bus segment and said second bus segment including a first number of data paths, and each data path of said second bus segment being separate and not directly connected to any data path of said first bus segment;
    a second data bus having a second number of data paths;
    an interface circuit connected between said first and second data buses, wherein said interface circuit is configured to selectively receive data on said first data bus and place said data on said second data bus, said interface circuit being connected to said first data bus between said first and second bus segments of said first data bus for passing data through from said first bus segment to said second bus segment and from said second bus segment to said first bus segment.

2. The interface of claim 1, wherein said interface circuit further comprises at least one of a multiplexer and demultiplexer that performs a data rate conversion between said first and second data buses.

3. The interface of claim 2, wherein said interface circuit further comprises a multiplexer and a demultiplexer which perform data rate conversions for data received on said first data bus that is placed on said second data bus and for data received on said second data bus that is placed on said first data bus.

4. The interface of claim 1, wherein said interface circuit further comprises at least one of a coder and decoder that performs at least one of a data encoding and decoding conversion between said first and second data buses.

5. The interface of claim 1, wherein said interface circuit further comprises a voltage converter that performs a voltage level conversion between said first and second data buses.

6. The interface of claim 1, wherein said first number of data paths is less than said second number of data paths.

7. The interface of claim 1, wherein said second data bus is connected to at least one memory device.

8. The interface of claim 1, wherein said first data bus is connected to a memory controller.

9. The interface of claim 1, wherein said first data bus is connected to a processor.

10. The interface of claim 1, wherein said interface circuit is connected to said first bus segment of said first data bus via a first set of I/O pins and to said second bus segment via a second set of I/O pins, and I/O pins of said first set are connected to respective I/O pins of said second set.

11. The interface of claim 1, wherein said first data bus operates at a first data rate faster than a second data rate at which said second data bus operates.

12. The interface of claim 1, wherein said first data bus operates at a first voltage level less than a second voltage level at which said second data bus operates.

13. The interface of claim 1, wherein said first data bus transmits analog signals.

14. The interface of claim 1, wherein said first data bus transmits digital signals.

15. The interface of claim 1, wherein said first data bus transmits radio-frequency (RF) signals.

16. The interface of claim 1, wherein said interface circuit selects data for receipt from said first data bus according to a selection signal received on a command and address bus.

17. The interface of claim 1, wherein said interface circuit is further configured to selectively receive data on said second data bus and place said data on said first data bus.

18. The interface of claim 17, wherein said interface circuit selects data for receipt from said second data bus according to a selection signal received on a command and address bus.

19. The interface of claim 1, wherein said first data bus is a multidrop bus.

20. The interface of claim 1, wherein said first data bus is a substantially stubless data bus.

21. A memory module, comprising:
    at least one memory device;
    a data transfer interface connected to a first data bus and to said at least one memory device by a second data bus, said data transfer interface comprising:
        a first bus segment of said first data bus, said first data bus having a first number of data paths and said second data bus having a second number of data paths;
        a second bus segment of said first data bus, said second bus segment having said first number of data paths, each of said data paths in said second bus segment being separate and not directly connected to any of said data paths in said first bus segment;
        an interface circuit connected between said first and second data buses, wherein said interface circuit is configured to selectively receive data on said first data bus and place said data on said second data bus, said interface circuit being connected to said first data bus between said first and second bus segments of said first data bus for passing data through from said first bus segment to said second bus segment and from said second bus segment to said first bus segment.

22. The memory module of claim 21, wherein said interface circuit further comprises at least one of a multiplexer and demultiplexer that performs a data rate conversion between said first and second data buses.

23. The memory module of claim 22, wherein said interface circuit further comprises a multiplexer and a demultiplexer which perform data rate conversions for data received on said first data bus that is placed on said second data bus and for data received on said second data bus that is placed on said first data bus.

24. The memory module of claim 21, wherein said interface circuit further comprises at least one of a coder and decoder that performs at least one of a data encoding and decoding conversion between said first and second data buses.

25. The memory module of claim 21, wherein said interface circuit further comprises a voltage converter that performs a voltage level conversion between said first and second data buses.

26. The memory module of claim 21, wherein said first number of data paths is less than said second number of data paths.

27. The memory module of claim 21, wherein said first data bus is connected to a memory controller.

28. The memory module of claim 21, wherein said first data bus is connected to a processor.

29. The memory module of claim 21, wherein said interface circuit is connected to said first bus segment of said first data bus via a first set of I/O pins and to said second bus segment via a second set of I/O pins, and I/O pins of said first set are connected to respective I/O pins of said second set.

30. The memory module of claim 21, wherein said first data bus operates at a first data rate faster than a second data rate at which said second data bus operates.

31. The memory module of claim 21, wherein said first data bus operates at a first voltage level less than a second voltage level at which said second data bus operates.

32. The memory module of claim 21, wherein said first data bus transmits analog signals.

33. The memory module of claim 21, wherein said first data bus transmits digital signals.

34. The memory module of claim 21, wherein said first data bus transmits radio-frequency (RF) signals.

35. The memory module of claim 21, wherein said interface circuit selects data for receipt from said first data bus according to a selection signal received on a command and address bus.

36. The memory module of claim 21, wherein said interface circuit is further configured to selectively receive data on said second data bus and place said data on said first data bus.

37. The memory module of claim 36, wherein said interface circuit selects data for receipt from said second data bus according to a selection signal received on a command and address bus.

38. The memory module of claim 21, wherein said first data bus is a multidrop bus.

39. The memory module of claim 21, wherein said first data bus is a substantially stubless data bus.

40. A data exchange system, comprising:
a first data bus, said first data bus including at least a first bus segment and a second bus segment, each of said first bus segment and said second bus segment including a same plurality of data paths, and each data path of each said bus segment being separate and not directly connected to any data path of any other of said bus segments;
a controller connected to place data on and receive data from said first data bus;
a processor connected to said controller via a second data bus, and
a data transfer interface circuit connected to said first data bus and to a third data bus, wherein said interface circuit is configured to selectively receive data on said first data bus and place said data on said third data bus, said interface circuit being connected to said first data bus between said first and second bus segments of said first data bus for passing data through from said first bus segment to said second bus segment and from said second bus segment to said first bus segment.

41. A data exchange system, comprising:
a first data bus, said first data bus including at least a first bus segment and a second bus segment, each of said first bus segment and said second bus segment including a same plurality of data paths, and each data path of each bus segment being separate and not directly connected to any data path of any other of said bus segments;
a processor connected to place data on and receive data from said first data bus; and
a data transfer interface circuit connected to said first data bus and to a second data bus, wherein said interface circuit is configured to selectively receive data on said first data bus and place said data on said second data bus, said interface circuit being connected to said first data bus between said first and second bus segments of said first data bus for passing data through from said first bus segment to said second bus segment and from said second bus segment to said first bus segment.

42. A method of data communication between devices in an electronic circuit, comprising:
connecting a first port of an interface circuit having first and second sets of I/O pins to respective first and second segments of a first data bus that operates at a first data rate;
connecting a second port of said interface circuit to a second data bus that operates at a second data rate;
receiving and transmitting data on said first data bus using said first and second sets of I/O pins of said first port;
receiving and transmitting data on said second data bus using said second port;
selectively converting data received from one of said first and second data buses at one of said first and second ports for use on the other of said first and second data buses; and
passing data on said first data bus from said first bus segment to said second bus segment and from said second bus segment to said first bus segment via said interface circuit; and
wherein each of said first and second segments of said first data bus have a same number of data paths and each data path in said first segment of said first data bus is not directly connected to any data path in said second segment of said first data bus.

43. A method as in claim 42, wherein said selectively converting data includes using a selection signal to determine whether to convert for use on the other of said first and second data buses.

44. A method as in claim 43, wherein said selective conversion of data is performed when said interface circuit is selected for operation by said selection signal.

45. A method as in claim 43, wherein said selective conversion of data is not performed when said interface circuit is not selected for operation by said selection signal.

46. A method as in claim 42, wherein said first data rate is faster than said second data rate.

47. A method as in claim 42, further comprising converting received data between said first data rate of said first data bus and said second data rate of said second data bus.

48. A method as in claim 42, further comprising converting received data between a first encoding of said first data bus and a second encoding of said second data bus.

49. A method as in claim 42, further comprising converting received data between a first voltage level of said first data bus to a second voltage level of said second data bus.

50. A method as in claim 49, wherein said first voltage level is less than said second voltage level.

51. A method as in claim 42, wherein said first data bus connects to said first and second sets of I/O pins of said first port using a first bus width different from a second bus width used to connect said second port to said second data bus.

52. A method as in claim 51, wherein said first bus width is less than said second bus width.

53. A method as in claim 42, wherein devices of a first technology communicate with said interface circuit using said first data bus and devices of a second technology communicate with said interface circuit using said second data bus.

54. A method as in claim 53, wherein said devices of said first technology include at least one processor.

55. A method as in claim 53, wherein said devices of said second technology include at least one memory device.

56. A method as in claim 42, wherein said looping data bus is a multi-drop bus.

57. A method as in claim 42, wherein said looping data bus is a substantially stubless data bus.

* * * * *